Dec. 31, 1968    G. M. HUBBARD    3,419,334
TELESCOPIC BOW SIGHTING DEVICE HAVING A FOLDED SIGHT PATH
AND A MOVABLE OBJECTIVE AND
SIGHTING AXIS DEFLECTOR
Filed Jan. 3, 1966    Sheet 1 of 4
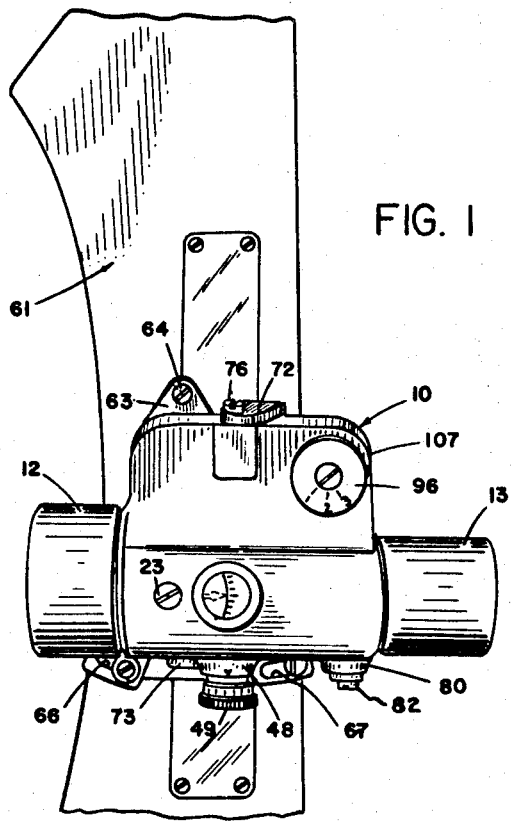
FIG. 1
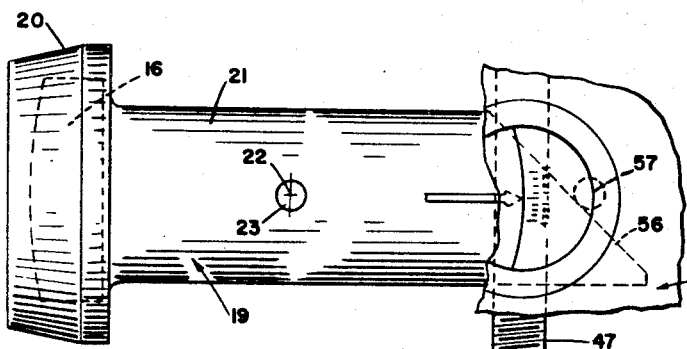
FIG. 9
GEORGE M. HUBBARD
INVENTOR.
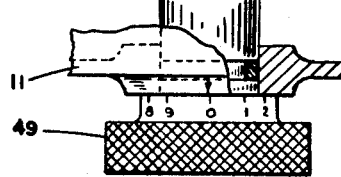
ATTORNEY

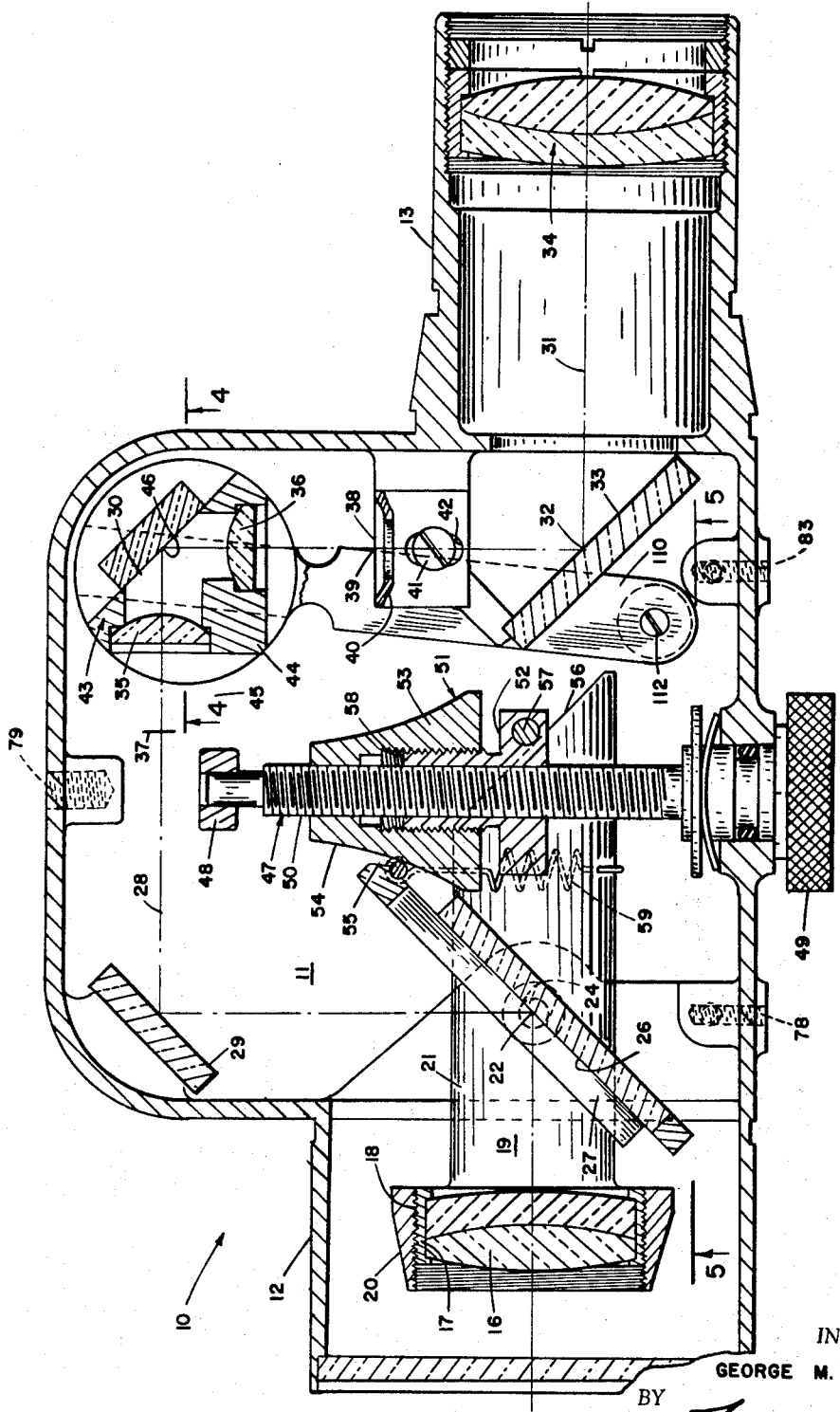

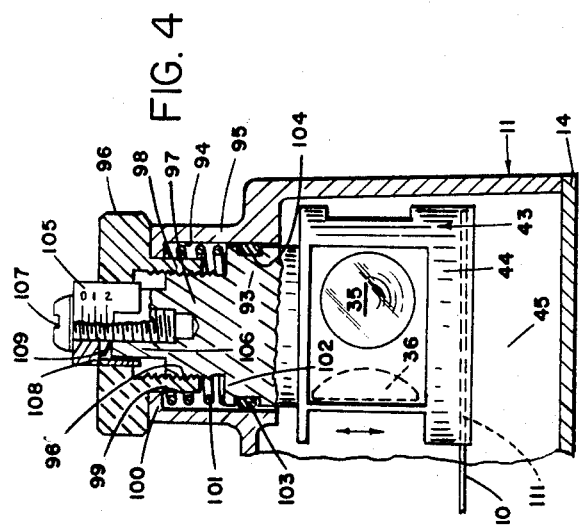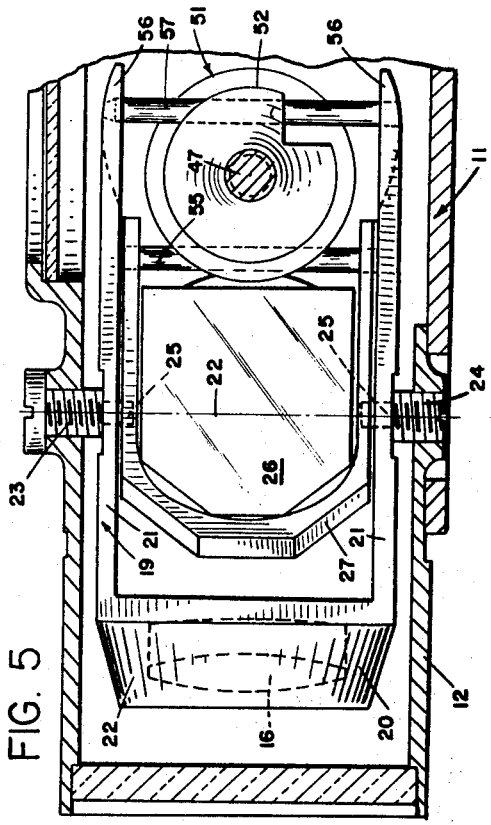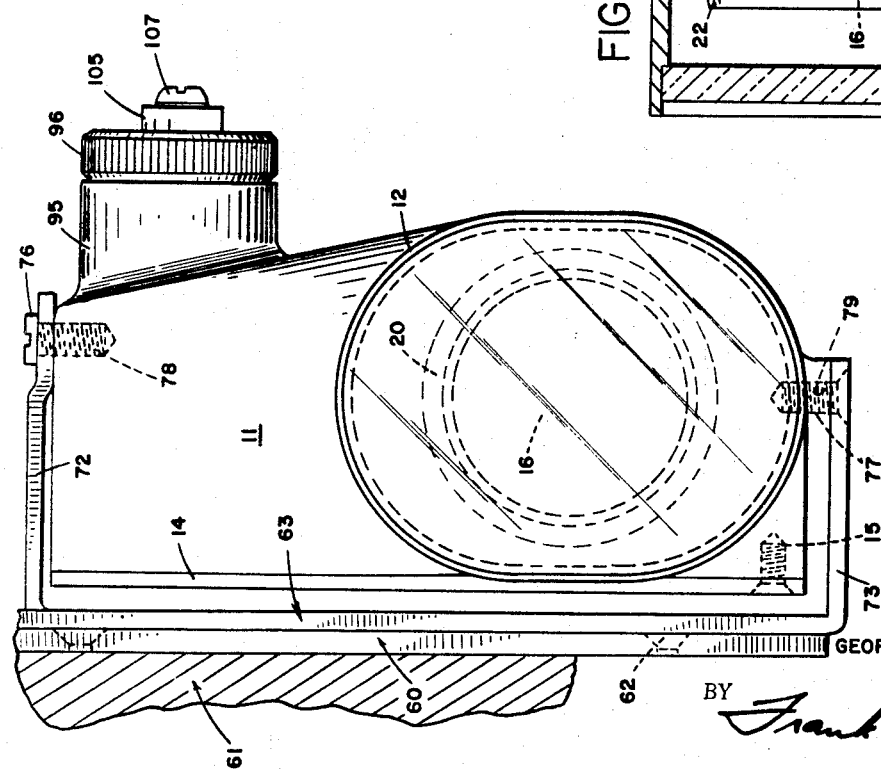

Dec. 31, 1968   G. M. HUBBARD   3,419,334
TELESCOPIC BOW SIGHTING DEVICE HAVING A FOLDED SIGHT PATH
AND A MOVABLE OBJECTIVE AND
SIGHTING AXIS DEFLECTOR
Filed Jan. 3, 1966　　　　　　　　　　　　　　Sheet 4 of 4
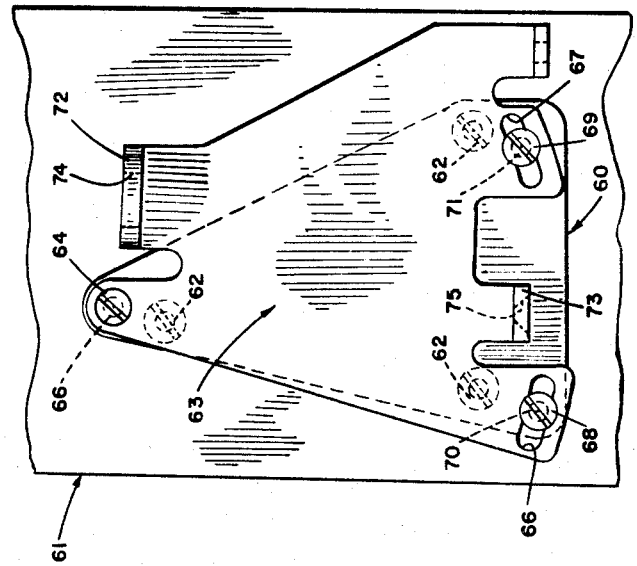
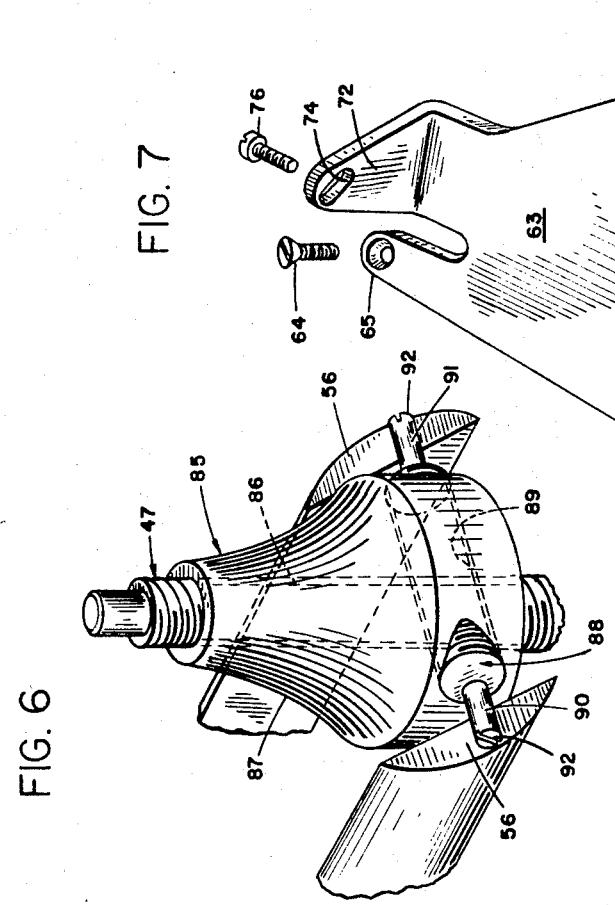
GEORGE M. HUBBARD
*INVENTOR.*
BY *Frank C. Parker*
ATTORNEY

United States Patent Office 3,419,334
Patented Dec. 31, 1968

3,419,334
TELESCOPIC BOW SIGHTING DEVICE HAVING A FOLDED SIGHT PATH AND A MOVABLE OBJECTIVE AND SIGHTING AXIS DEFLECTOR
George M. Hubbard, Greece, N.Y., assignor to Bausch & Lomb Incorporated, Rochester, N.Y., a corporation of New York
Filed Jan. 3, 1966, Ser. No. 518,395
9 Claims. (Cl. 356—254)

The present invention relates to a telescopic bow sighting device and more particularly it relates to the mechanical mounting for an optical system therefor.

With the rise in popularity of archery in modern times, there has been an increased desire for aids in sighting for the archer and such aids in the prior art have predominantly consisted of various simple mechanical devices which have many undesirable features or which lack decidedly that degree of accuracy demanded by the more modern archery practice. The effort to provide a telescopic type of archery sight has been evident recently but no known sighting devices appear to completely satisfy the desires of the modern archer. An object of the present invention is to provide a telescopic type of bow sighting device which is small and compact enough to be carried unobtrusively on the bow and which is strong and sturdy enough to withstand normal rough handling by the archer.

It is a further object to provide such a telescopic bow sighting device which incorporates both elevational and windage adjustments with an excellent degree of precision and which is adaptable to either right- or left-handed archers.

It is a further object of this invention to provide a near optimum compact sight both longitudinally and transversely which has means provided for adjusting the bow sight through a wide range of preliminary adjustments in accordance with the archer's desire, such mechanism being adaptable to different styles of bows.

It is a further object to provide such a device wherein the mechanism for mounting the optical elements of the bow sight is so designed, arranged and combined that the aforesaid compactness is provided without excessive cost.

Further objects and advantages reside in the details of construction and combination and arrangement of parts, reference being had to the specification herebelow taken in connection with the accompanying drawing for a full explanation of the invention, the figures of the drawing being as follows:

FIG. 1 is a side elevation of a preferred form of the present invention as applied to an archer's bow;

FIG. 2 is a midsectional view of the aiming device shown in FIG. 1 drawn to a larger scale;

FIG. 3 is a front elevation of the sighting device with its attachment bracket;

FIG. 4 is a sectional view taken on the line 4—4 of FIG. 2 showing an operating part of said device;

FIG. 5 is a partially sectional view of said device taken on the line 5—5 of FIG. 2;

FIG. 6 is a substantially midsectional view of a portion of the elevational adjustment mechanism showing a modified form thereof;

FIG. 7 is a perspective view of the mounting bracket for said device;

FIG. 8 is a plan view of a base plate used in mounting said device; and

FIG. 9 is a schematic view of the indicating mechanism for the elevation adjustment of said device.

The present invention, as aforesaid, comprises mechanical details of a mounting for a telescopic type of bow sight which is designated by the numeral 10 in FIGS. 1 and 2. The bow sighting device 10 comprises a two-part housing, one part serving as a cover for the other part as indicated hereinafter, and the main body of the housing consisting of a large open, generally square, compartment 11 having front and rear tubular extensions designated 12 and 13 respectively which are substantially aligned on a common axis extending generally horizontally. The aforesaid cover is designated 14 and is held in place on the compartment 11 by means of a plurality of screws 15.

The eyepiece or exit pupil of the sighting device 10 is angularly horizontally offset by a small angle away from a direct line of sight to compensate for the necessary off-axis position of the archer's eye with respect to the sighting device. This remedy is chosen as a means of reducing the amount of windage adjustment of the device 10 otherwise required.

Within the front tubular extension 12 is freely held an objective lens 16 which is held in an adjustable lens cell 17. Said lens cell 17 is held in any desirable manner, such as the threads 18 in a lens carriage which is generally designed by the numeral 19, said lens carriage consisting of a head portion 20 wherein said objective lens is held and an adjacent beam-like extension or arm 21. Said arm 21 is pivotally mounted approximately midway of its length in said compartment 11 on a horizontal axis 22 so that the objective lens may be swung about the axis in a substantially vertical plane. The pivot mechanism preferably consists of two opposite threaded studs 23 and 24 which are threaded to the side walls of the housing and are provided with a smooth pilot extension 25 which is fitted into corresponding bores in the side arms 21 of the lens carriage 19.

At the horizontal axis 22 is mounted a flat mirror 26 which lies along said axis and is pivotable thereabout by means to be described hereinafter. The mirror 26 is securely mounted in any desired manner, such as cementing, in a mirror frame 27 wherein the studs 25 engage.

Another feature of the present invention is the folded structure of the optical system whereby compactness thereof is promoted. The folded or offset portion of the optical axis is designated generally by numeral 28. In the adjacent corner of the compartment 11 is fixed a flat mirror 29 which is designated the second mirror and which receives the rays reflected vertically by the mirror 26, the other mirror 29 reflecting the image rays generally horizontally along the offset portion of the optical axis 28. In the opposite upper corner of the compartment 11 is secured a third flat mirror 30 which receives the image rays which are reflected along the axis portion 28 and directs these rays vertically in an opposite direction to the rays cast by the first mirror 26 toward a substantially horizontal axis portion 31. At a point 32 on the axis portion 31 a fourth flat mirror 33 is secured in an inclined position such that the image rays are reflected rearwardly through the rear tubular extension 13 to an eyepiece lens 34 held therein.

In the vicinity of the third mirror 30 an erector lens system, which in this form of the invention consists of two lenses 35 and 36, is mounted on the offset portion of axis 28, the erector lens relaying the image from a previous image plane 37 and in turn reimaging the image rays at a second image plane 38. At the second image plane 38 is provided a sighting reticle 39 of any preferred form, said reticle being secured on one face of a reticle mounting bracket 40. The reticle mounting bracket is held by a screw 41 which extends through an elongated slot 42 in the bracket so that axial adjustment of the reticle may be obtained to locate the reticle exactly in the image plane 38 and to satisfy dimension tolerances. Alternately, the objective 16 may be moved to place the focal point thereof exactly on said reticle 39.

Another of the features of this invention relates to means for obtaining windage adjustments in sighting the bow. Such a windage adjustment in the preferred form of the invention consists of a mounting block 43 wherein is held the erector lenses 35 and 36. The mounting block for simplicity of structure is generally cylindrical in shape and is provided with a head portion 44 which is held freely in the upper portion 45 of the compartment 11. By endwise or axial motion of the cylindrical mounting block 43, the erector lenses 35 and 36 are displaced off axis for the purpose of deviating the image rays in a horizontal plane to effect the windage adjustment. Furthermore, for the advantages of compactness, the windage adjustment mounting block 43 also has formed thereon at the axial intersection point 46 a seating surface whereon the third mirror 30 is secured in any desired manner, such as cementing. In addition to the advantages of compactness of structure, this type of mounting for the mirror in conjunction with the erector lenses 35 and 36 effects a considerable reduction in the size of the mirror required to accommodate the off-axis or windage motion of the mounting block 33 so that no vignetting occurs. Additionally, by virtue of the fact that there is no focal point lying between the lenses 35 and 36, any dust particles collecting on the mirror are not visible in the field of view.

The aforementioned elevational adjustments of the sighting axis in a vertical plane will now be described, the motion of the mirror 26 being half of the angular motion of the objective 16 so that the reflected rays from the mirror are always vertical and impinge on the same location on the second mirror 29 for all pivoting positions thereof. In the bottom wall of the compartment 11 is secured and journaled an actuating shaft 47 which projects substantially vertically through the open compartment adjacent to the movable mirror 26, the other end thereof being journaled in a suitable boss 48 formed on the wall of the compartment. On an exterior end of the actuating shaft 47, means are provided for rotating the shaft, such as a knob 49. As shown in FIG. 2 of the drawing, the actuating shaft 47 is threaded a major portion of its length at 50 and on the shaft is provided a nut member 51 which is provided with two parts. Said two parts consist of an inner threaded member 52 whereon is threaded a second outer threaded member 53, the inner threaded member being used to raise and lower the nut member 51 during operation of the movable mirror 26. The function of the outer threaded member is to secure preset adjustments in the tilt of the movable mirror 26 while assembling the device.

In order to move the mirror member 26, the outer threaded member is provided with a somewhat conical surface 54 which is somewhat curved away from the mirror in any suitable conical shape so as to obtain a coordinated movement of the mirror with respect to the objective lens as above mentioned. On the mirror frame 27 is provided a cross rod 55 which serves as a contact member which is urged against the conical surface 54. The lens carriage 19 is in effect built like a first-class lever wherein pressure is applied on the end opposite to the objective lens to pivot the carriage about the pivot studs 23 and 24 and to effect the pivoting movement. A cam surface 56 is formed obliquely on said end of the carriage 19 and is inclined to the axis of the actuating shaft 47. On the inner threaded member 52 is secured a second cross bar 57 which serves as a contact member to bear on the pair of cam surfaces 56 on the outboard end of the lens carriage 19. It will be seen that when the outer threaded member 53 is adjusted vertically by means of its threaded connection 58 the tilt of the mirror 26 is changed.

It will be noticed that the contact surface of the outer threaded member 53 on the side whereon the cross rod 55 rides extends in an opposite direction from the cam surfaces 56 on the end of the lens carriage 19 so that it is possible to maintain the cross rods 55 and 57 in engagement with their respective cam surfaces 54 and 56 by the use of only one tension spring 59 which is connected at one end to the cross rod 55 and at the other end to the lower side of the extended arm 21. By using this construction, all of the forces involved in maintaining effective contact between the cross rods and their respective cam surfaces are closely coupled in a small area in the vicinity of the actuating shaft 47 so that compact and simple construction is provided.

Although some archers' bows are provided with a built-in metal plate in the mounting face thereof, others are not, and therefore a flat base plate 60 of any desired shape is provided, as shown in FIG. 8. To attach the plate 60 to the bow 61, a plurality of screws, as needed, are held in suitably located holes 62 in the plate and are threaded into the bow.

The bow sighting device 10 is mounted on the base plate 60 for adjustment purposes by means of a mounting bracket 63 which is shown per se in FIG. 7. It is necessary that the sighting device 10 be initially adjusted in both horizontal and vertical planes to accommodate the device to the individual shooting style and habits of the archer. For that reason, said bracket 63 is movably held on the base plate 60 by a pivot screw 64 which extends through a hole 65 therein and is threaded into a tapped hole 66 formed in the base plate 60. Furthermore, at the lower edge of the bracket 63 is formed two arcuate and elongated slots 66 and 67 which are curved in an arc that is centered on the pivot screw 64. Through slots 66 and 67 extend the clamp screws 68 and 69 which are threaded at 70 and 71 into the plate 60 (FIG. 8) whereby initial alignment movements in a vertical plane may be effected.

Additionally, the bracket 63 is provided with an upper lug 72 and a lower lug 73 formed on the upper and lower edges of the bracket, said lugs standing up normal to the body of the bracket. For providing relative initial alignment adjustments of the device 10 in a horizontal plane, holes 74 and 75 are formed in the lugs 72 and 73 respectively, through which suitable holding screws 76 and 77 extend, said screws serving as pivots and being threaded into tapped holes 78 and 79 in the housing compartment 11. Formed on the lower edge of bracket 63 and spaced from lug 73 is a third upstanding lug 80. Longitudinally of lug 80 is formed an elongated slot 81 and through said slot extends a lock screw 82 which is threaded into a tapped hole 83 formed in the housing 11 whereby the sighting device may be initially oriented relative to the bow in a horizontal direction.

In FIG. 6 is shown a modification of the nut member 51 wherein its structure is greatly simplified. In the modified form, a unitary nut member 85 is provided having a threaded opening 86 formed axially therein which is fitted onto the threads of the actuating shaft 47. On the exterior of the nut member 85, a truncated somewhat conical surface 87 is formed similar to surface 54 of nut member 51 and serving the same purpose. An actuating connection is established between the nut member 85 and the cam surface 56 on the lens carriage 19 and such a connection comprises an eccentric contact member 88. Said contact member 88 is characterized by a central cylindrical portion 89 which is closely threaded into a corresponding horizontal opening in the nut member 85. On opposite ends of the central portion 89 are formed two cylindrical bearing pins 90 and 91 eccentrically to portion 89 and in the outer ends thereof open slots 92 are formed whereby the contact member may be rotated to change the relative elevation of the cam surface 56.

With reference to the aforesaid mounting block 43 for the windage adjustment, an advantageous form of mechanism for accomplishing the aforesaid windage adjustment is shown in detail in FIG. 4. Said mounting block 43 has a short preferably round supporting shaft 93 formed thereon whereby the block is solely aligned and slidably supported in a bore 94 formed in a protuberant lateral boss 95 which is a part of the housing 11.

Means for moving the block 43 and shaft 93 axially are provided by an internally threaded knob 96 which is engaged with a threaded extension 97 of the shaft 93 and abuts against the outer end of the boss 95. Said internal threads are formed in a tubular portion 98 of the knob 96, the outer diameter of said portion being loosely journaled on a cylindrical bearing surface 99 formed on a radial flange 100 on said boss 95. The internal threads 96' on knob 96 apply a tractive force to the shaft 93 which is opposed by the force of an expansion spring 101 seated at one end against a shoulder 102 on the shaft and at the other end against the flange 100. In order to seal the housing 11 against entrance of moisture or foreign matter, an O ring 103 is provided which is seated under compressive stress in a recess 104 in said shaft so that it bears firmly against the bore 94.

Means for measuring the adjusting axial motion of the stub shaft 93 is provided comprising a scale bearing sleeve 105, shown in half section in FIG. 4, which is secured to a reduced secondary extension 106 on shaft 93 by a retaining screw 107. A clearance opening 108 is provided in knob 96 for accommodating the scale bearing sleeve 105. Preferably, a Belleville or waffle washer 109 which is axially resilient is positioned between the scale sleeve 105 and the end surface of the secondary extension 106 whereby the zero position of the scale may be adjusted axially with respect to the front face of the knob 96. Rotation of the knob 96 therefore results in a lateral displacement in the direction of the double arrow to change the windage adjustment as indicated by the scale on the sleeve 105.

In order to prevent any angular displacement of the lens holding block 43 during the axial displacement thereof, a flexible spline 110 is provided which is fixed tightly by any preferred means such as a frictional connection in a shallow slot 111 formed in the end face of the block. The other end of the spline 110 is fixed by an anchor screw 112 to the side wall of the housing 11. For the purpose of permitting ample axial movement of the block 43, the spline is long, thin and flexible but it is wide enough to provide the necessary rigidity with respect to stresses thereon which are directed in a vertical plane.

It will be observed from the foregoing description that the present invention provides a compact and accurate sighting device for an archer's bow, said device being relatively light in weight and easy to operate in accordance with the stated objects of the invention. Although only certain forms of said invention have been shown and described in detail, other forms are possible and changes may be made in the details of construction and arrangement thereof without departing from the spirit of the invention as defined in the claims here appended.

I claim:

1. In a telescopic bow sighting device, mounting mechanism for its folded optical system comprising:
    a housing characterized by walls forming a central compartment, and aligned front and rear tubular extensions formed on opposite sides thereof and leading thereinto,
    an objective lens carriage which is located in said front tubular extension,
    means cooperatively formed on said carriage and housing for pivotally mounting said carriage for swinging motion in a vertical plane about a horizontal axis which intersects the axis of said lens,
    mirror mounting means for mounting a first flat mirror obliquely of said lens axis in coincidence with with said horizontal axis for pivoting movements thereabout in said vertical plane,
    means in said compartment operatively constructed on both said carriage and said mirror for moving coincidentally the mirror through half the angle that said carriage is moved whereby the reflected axial rays from the mirror always remain vertical and elevational adjustments of said device are effected,
    means for mounting in said compartment a second and a third flat inclined mirror to form the folded axis portion in optical alignment to receive the vertical rays,
    means for mounting a sighting reticle in alignment with said folded axis portion at a focal plane of said system, and
    means for mounting an eyepiece in the rear tubular extension of said housing in optical alignment with and focused upon said reticle.

2. In a telescopic bow sighting device mounting mechanism for its folded optical system as set forth in claim 1 further characterized by:
    said means for pivotally mounting said carriage being located intermediate of its ends, and
    said means for moving the mirror and carriage including a substantially vertical actuating shaft which is journaled at one end in the wall of said housing, and further includes a nut member which is threaded onto said shaft and is operably connected to said pivoted mirror and to the end of the lens carriage opposite to the lens end so that rotation of the actuation shaft causes the nut member to move the mirror and carriage simultaneously in a prescribed relative manner.

3. In a telescopic bow sighting device, mounting mechanism for its folded optical system as set forth in claim 2 further characterized by:
    said end of the lens carriage opposite to said objective lens having formed thereon an inclined cam surface,
    said nut member having a cam-like inclined surface formed thereon in a direction generally crosswise to the first said inclined cam surface, the rim of the movable mirror being biased against said cam-like surface, and said nut member further having a cam follower bar secured therein so as to project into contact with the cam surface on the lens carriage, and a tension spring operatively constructed to urge said mirror and carriage toward each other and into firm contact with their respective adjacent cam surfaces.

4. Mounting mechanism for a folded optical system of a telescopic bow sighting device comprising:
    a housing,
    means for forming in said housing a large central compartment and a front and a rear longitudinally aligned chamber opening thereinto on opposite sides thereof,
    a lens carriage located in one of said chambers and carrying in one end an objective lens, said carriage being pivoted intermediate of its ends for rotation in a vertical plane about a horizontal axis which intersects the axis of said lens,
    mirror mounting means for pivotally mounting a first flat mirror obliquely of said lens axis so as to receive image rays from said lens and deflect the rays substantially vertically, the axis of motion thereof coinciding with the aforesaid horizontal axis and the amplitude of motion being half that of said carriage whereby the reflected rays are constant in direction and centered on a second axis portion during simultaneous movement of said lens and mirror to effect elevation adjustments,
    an inclined fixed mirror mount anchored in said compartment of the housing for positioning a second flat mirror to receive said reflected rays and deviate the rays horizontally away from said lens along a third axis portion,
    a laterally movable mounting block wherein an erector lens is held in the horizontal rays in optical alignment with and focused on the rear focal point of the objective lens whereby windage adjustments are effected, means for holding a third inclined flat mirror in said compartment in position to receive image rays from said erector lens and reflect said rays substantially parallel to said second axis portion along a fourth axis portion, a reticle fixedly mounted in said compartment on said fourth axis portion at the focal plane formed by said erector lens, guide means cooperatively formed on said lens holding member and housing crosswise thereof for providing lateral windage adjustment movement of said member relative to said reticle, a fourth inclined mirror mount anchored in said compartment diagonally opposite to the first fixed mirror mount for inclinably positioning a fourth flat mirror in alignment to receive rays which pass through said reticle and reflect said rays horizontally rearwardly, and means constructed in the rear end of the rear chamber for mounting an eyepiece in a position to receive the rays reflected from the fourth mirror.

5. Mounting mechanism for a folded optical system of a telescopic bow sighting device as set forth in claim 4 further characterized by:

said third flat mirror being fixed on said mounting block in a location between two lens parts of said erector lens whereby said lens and mirror move as a unit during windage adjustments of the block.

6. Mounting mechanism for a folded optical system of a telescopic bow sighting device as set forth in claim 5 further characterized by:

said mounting block being generally cylindrical in shape and said housing having formed therein a laterally and horizontally directed cylindrical seating surface whereon the block is slidably fitted, and connecting means operatively constructed on both said block and housing for opposing relative rotation of the block with reference to the seating surface during axial adjustment of said block.

7. Mounting mechanism for a folded optical system of a telescopic bow sighting device as set forth in claim 6 further characterized in that:

said connecting means includes a thin flexible spline which is secured at one end flatwise against the inner end of said block and is secured at its other end to the inner part of said compartment whereby said block is free to move relative to the housing a limited distance without rotation.

8. Mounting mechanism for a folded optical system of a telescopic bow sighting device as set forth in claim 3 further characterized by:

said nut member being of unitary construction and said cam follower bar being eccentrically formed on a cylindrical adjustment member which is rotatably fitted in a bore in said nut member whereby initial optical alignment of said device may be preset by rotation of said bar.

9. Mounting mechanism for a folded optical system of a telescopic bow sighting device comprising:

a housing, means for forming in said housing a large central compartment and a front and a rear longitudinally aligned chamber opening thereinto on opposite sides thereof, a lens carriage located in one of said chambers and carrying in one end an objective lens, said carriage being pivoted intermediate of its ends for rotation in a vertical plane about a horizontal axis which intersects the axis of said lens, mirror mounting means for pivotally mounting a first flat mirror obliquely of said lens axis so as to receive image rays from said lens and deflect the rays substantially vertically, the axis of motion thereof coinciding with the aforesaid horizontal axis and the amplitude of motion being half that of said carriage whereby the reflected rays are constant in direction and centered on a second axis portion during simultaneous movement of said lens and mirror to effect elevation adjustments, an inclined fixed mirror mount anchored in said compartment of the housing for positioning a second flat mirror to receive said reflected rays and deviate the rays horizontally away from said lens along a third axis portion, a horizontal cylindrical seating surface formed in the wall of said housing laterally of said lens axis, a mounting block which is slidably fitted to move on said seating surface, and wherein an erector lens is held in the horizontal rays in optical alignment with and focused on the rear focal point of the objective lens so that movement of the block along the seating surface effects windage adjustments in the device, a windage adjustment knob which is rotatably held in a stationary position in said housing and is tractively operatively connected to move said block in at least one direction.

a central cylindrical boss formed axially on the outer end of said block, a micrometer barrel releasably secured on said boss and projecting outwardly beyond said knob through an opening therein, the barrel being provided with scale divisions which are alignable with the outer face of said knob to indicate a reading of windage adjustment, means for fixedly holding a reticle in said compartment at the focal plane formed by said erector lens, and means constructed in the rear chamber for mounting an eyepiece which is focused on said reticle.

References Cited

UNITED STATES PATENTS 1,000,607  8/1911  Kellner.
1,413,207  4/1922  Voller.

JEWELL H. PEDERSEN, *Primary Examiner.*

O. B. CHEW II, *Assistant Examiner.*

U.S. Cl. X.R.

33—46, 50; 350—10, 51, 53, 285